US012227282B2

(12) United States Patent
Mueller et al.

(10) Patent No.: US 12,227,282 B2
(45) Date of Patent: Feb. 18, 2025

(54) BARRIER DOOR FOR AN AIRCRAFT (71) Applicant: The Boeing Company, Arlington, VA (US)

(72) Inventors: Andrew William Mueller, Mukilteo, WA (US); Christopher Schwitters, Bothell, WA (US)

(73) Assignee: THE BOEING COMPANY, Arlington, VA (US)

( * ) Notice: Subject to any disclaimer, the term of this patent is extended or adjusted under 35 U.S.C. 154(b) by 63 days.

(21) Appl. No.: 18/336,106

(22) Filed: Jun. 16, 2023

(65) Prior Publication Data
US 2024/0417056 A1 Dec. 19, 2024

(51) Int. Cl.
B64C 1/14 (2006.01)
B64D 45/00 (2006.01)

(52) U.S. Cl.
CPC ........ *B64C 1/1469* (2013.01); *B64D 45/0028* (2019.08)

(58) Field of Classification Search
CPC ...... B64C 1/14; B64C 1/1469; B64D 45/0028
See application file for complete search history.

(56) References Cited

U.S. PATENT DOCUMENTS

| 5,285,596 | A | 2/1994 | Kinsey |
| 6,783,098 | B1 | 8/2004 | Chavez |
| 9,428,940 | B1 | 8/2016 | Patrick |
| 11,208,744 | B2 | 12/2021 | Urbelis |
| 2003/0047648 | A1* | 3/2003 | Batt ................. B64C 1/1469 244/118.5 |
| 2003/0080249 | A1* | 5/2003 | Raczkowski ......... B64C 1/1469 244/118.5 |
| 2003/0122036 | A1* | 7/2003 | Artsiely ............. B64D 45/0028 244/129.4 |
| 2013/0269258 | A1* | 10/2013 | Koch ...................... E05G 5/003 49/67 |

(Continued)

FOREIGN PATENT DOCUMENTS

CN 212614220 U 2/2021
EP 2796370 A1 10/2014
(Continued)

OTHER PUBLICATIONS

Federal Aviation Administration, "Ac 120-110—Aircraft Secondary Barriers and Alternate Flight Deck Security Procedures", U.S. Department of Transportation, Apr. 14, 2015, pp. 1-5.
(Continued)

*Primary Examiner* — Tye William Abell
(74) *Attorney, Agent, or Firm* — COATS & BENNETT, PLLC (57) ABSTRACT

A barrier door to control movement of persons through an opening within a cabin area of an aircraft. The barrier door includes a body comprising an upper side, a lower side, and lateral sides. A lock is connected to the body and includes an elongated member and a pin. The pin is movable between a disengaged position with a distal end retracted and an engaged position with the distal end extending outward beyond the elongated member. A release mechanism is threaded on the elongated member and is rotatable relative to the elongated member to adjust a position of the elongated member and pin relative to the body.

20 Claims, 12 Drawing Sheets

(56) References Cited

U.S. PATENT DOCUMENTS

| | | | |
|---|---|---|---|
| 2016/0083092 | A1 | 3/2016 | Long et al. |
| 2017/0341750 | A1 | 11/2017 | Gonnsen |
| 2018/0265216 | A1 | 9/2018 | Breigenzer |
| 2018/0346091 | A1 | 12/2018 | Movsesian et al. |
| 2020/0108907 | A1* | 4/2020 | Movsesian ......... B64D 45/0026 |
| 2020/0115029 | A1 | 4/2020 | Movsesian et al. |

FOREIGN PATENT DOCUMENTS

| | | |
|---|---|---|
| EP | 2851296 A1 | 3/2015 |
| EP | 3552963 A1 | 10/2019 |
| EP | 3741676 A1 | 11/2020 |
| GB | 2307712 A | 6/1997 |

OTHER PUBLICATIONS

Hexarmor, "SuperFabric cut protection, HexArmor with cut-resistant SuperFabric inside", Jan. 1, 2023, pp. 1-2.

Aitex, "Anti-Vandal Upholstery Resistant to Cuts by Stabs and Arson", retrieved from the internet: URL: https://www.aitex.es/tapicerias-antivandalicas/ [retrieved on May 2, 2023]; pp. 1-5.

Cut-Tex Pro, "The Ultimate Cut Protection—Technical Data Sheet", Jan. 1, 2023, pp. 1-3.

Peppermill Home, "Spectrum via 36×80 Vinyl Folding Door", Jan. 1, 2023, pp. 1-5.

Wheatbelt, Inc., "Two New Rolling Shutter Slats from Wheatbelt, Inc.", Jan. 1, 2023, pp. 1-5.

Wheatbelt, Inc., "Rolling Shutter Manufacturing in Hillsboro, KS", retrieved from the internet: URL: https://www.rollupshutter.com [retrieved on Jun. 15, 2023], p. 1.

ROLL-A-SHIELD, "RAS-section-view-of-slats", retrieved from the internet: URL: https://rollashield.com/shutters/ras-section-view-of-slats/ [retrieved on Jun. 15, 2023], pp. 1-2.

Cut-Tex Pro, "Cut Resistant Fabric for Clothing & Workwear (Cut Level 5)", retrieved from the internet: URL: https://cut-tex.com/ [retrieved on Jun. 15, 2023], pp. 1-25.

Aitex, "Vandal Proof Upholstery Which Can Withstand Slashing and Burning", retrieved from the internet: URL: https://www.aitex.es/tapicerias-antivandalicas/?lang=en [retrieved on Jun. 15, 2023], pp. 1-5.

Hexarmor, "Global Leader in Personal Protective Equipment", retrieved from the internet: URL: https://www.hexarmor.com/ [retrieved on Jun. 15, 2023], pp. 1-5.

Kozane, "High-performance and cut-resistant fabrics for outstanding protection and wearability", retrieved from the internet: URL: https://www.kozaneprotection.com/ [retrieved on Jun. 15, 2023], pp. 1-6.

EP Search Report mailed Jul. 24, 2024 in re EP Application No. 24167937.2.

EP Search Report mailed Aug. 26, 2024 in re EP Application No. 24165860.8.

* cited by examiner

BARRIER DOOR FOR AN AIRCRAFT

TECHNOLOGICAL FIELD

The present disclosure relates generally to the field of barriers and, more specifically, to barrier doors configured to be used within an aircraft.

BACKGROUND

Aircraft have a flight deck that includes flight instruments, instrument panels, and various controls that enable the flight personnel to operate the aircraft. The flight deck is positioned towards the front of the aircraft and is usually a separate compartment away from the cabin area where passengers sit during flight. A flight deck door further separates the flight deck from the cabin area.

The flight deck door is closed and locked during flight. This allows the flight personnel to concentrate on operating the aircraft and prevents entry of unwanted persons onto the flight deck. However, the flight deck door may be opened during flight for various reasons. One occurrence is when the flight personnel use the lavatory which is located in the cabin area of the aircraft. Other occurrences are when food and/or drinks that are prepared in the galley of the cabin area are delivered to the flight personnel on the flight deck, and when flight personnel leave the flight deck during a break.

Opening of the flight deck door could present an opportunity for an unwanted person to gain entry to the flight deck. The unwanted person could suddenly rush the front of the aircraft once the flight deck door is opened and force their way into the flight deck. It would be difficult for flight personnel working in the cabin area to react to this movement in a fast enough manner to close and lock the flight deck door.

A device is needed that would inhibit a person in the cabin area from rushing towards the flight deck. The device would prevent the person from reaching the front of the aircraft or would slow their movement such that the flight deck door could be closed and locked prior to the person reaching the flight deck.

SUMMARY

One aspect is directed to a barrier door to control movement of persons through an opening within a cabin area of an aircraft. The barrier door comprises a body comprising an upper side, a lower side, and lateral sides. A lock is connected to the body and comprises a cylinder with an elongated shape comprising an inner end and an outer end and an interior space that is hollow, a pin positioned within the interior space of the cylinder and movable between a disengaged position with a distal end retracted within the interior space and an engaged position with the distal end extending outward beyond the outer end of the cylinder, a biasing member that biases the pin towards the engaged position, and a release mechanism threaded to the inner end of the cylinder with the release mechanism rotatable relative to the cylinder to adjust a position of the cylinder and pin relative to the body.

In another aspect, the outer end of the cylinder is aligned with the upper side of the body for the pin to extend outward beyond the body in the engaged position.

In another aspect, a handle extends outward from the pin and an opening in the cylinder is in communication with the interior space with the opening comprising a first section and a second section and the handle is in the first section of the opening when the pin is in the disengaged position and in the second section of the opening when the pin is in the engaged position.

In another aspect, the body comprises a first side and a second side and the handle extends outward beyond the first side of the body and is positioned away from the second side of the body.

In another aspect, an opening is in the body and the release mechanism comprises a sleeve with the sleeve positioned in the opening and the sleeve is accessible from both the first side of the body and the second side of the body.

In another aspect, the release mechanism comprises a sleeve that extends around the inner end of the cylinder with the sleeve comprising interior threads and the cylinder comprising exterior threads.

In another aspect, a receptacle is configured to be mounted in proximity to the body with the receptacle comprising a biased plug sized to contact against the distal end of the pin when the pin is in the engaged position.

In another aspect, the body comprises a plurality of vertical slats that are hingedly connected together with the barrier door movable between an open position with the vertical slats in a folded configuration and a closed position with the vertical slats in an unfolded configuration.

In another aspect, the pin is fixedly positioned relative to the cylinder during rotation of the release mechanism.

One aspect is directed to a barrier door to control movement of persons through an opening within a cabin area of an aircraft. The barrier door comprises a body comprising an outer perimeter. A sleeve is connected to the body. A first elongated member is connected to and extends outward from the sleeve in a first direction. A second elongated member is connected to and extends outward from the sleeve in a second direction. A first pin is connected to the first elongated member and a second pin is connected to the second elongated member. The first pin and the second pin are movable between retracted positions that are inward within the outer perimeter of the body and extended positions that are outward beyond the outer perimeter of the body. The sleeve is rotatable relative to the first elongated member and the second elongated member to move both of the first pin and the second pin inward within the outer perimeter of the body in the extended positions.

In another aspect, each of the first elongated member and the second elongated member are cylinders with a hollow interior space and the first pin is positioned within the first elongated member and the second pin is positioned within the second elongated member.

In another aspect, the sleeve is positioned along a central section of the body and the first elongated member extends outward towards an upper side of the body with the first pin extending outward beyond the upper side of the body in the extended position.

In another aspect, the second elongated member extends outward towards a lower side of the body with the second pin extending outward beyond the lower side of the body in the extended position.

In another aspect, the first pin is fixedly positioned relative to the first elongated member during rotation of the sleeve and the second pin is fixedly positioned relative to the second elongated member during rotation of the sleeve.

In another aspect, the sleeve, the first elongated member, and the second elongated member are aligned together and extend along a lateral side of the body.

In another aspect, the sleeve is connected with threads to each of the first elongated member and the second elongated member.

In another aspect, each of the first pin and the second pin comprise a main body with a proximal end and a distal end and a handle that extends outward from the main body between the proximal end of the distal end with the handle extending outward from the respective first elongated member and the second elongated member in the retracted position.

One aspect is directed to a method of controlling movement of passengers through an opening within a cabin area of an aircraft. The method comprises: positioning a barrier door in a closed position that extends across the opening; while in the closed position, locking the barrier door by moving a first pin and a second pin that are each connected to the barrier door to engaged positions with the first pin extending outward beyond an upper side of a body of the barrier door and engaging the first pin with a ceiling of the aircraft and with the second pin extending outward beyond a lower side of the body and engaging the second pin with a floor of the aircraft; while the first pin and the second pin are in the engaged positions, rotating a sleeve that is connected to the body and retracting the first pin and disengaging the first pin from the ceiling and simultaneously retracting the second pin and disengaging the second pin from the floor; and while the first pin and the second pin are disengaged, positioning the barrier door in an open position that provides passage through the opening.

In another aspect, the method further comprises moving the first pin within a first cylinder and extending a distal end of the first pin outward beyond the upper side of the body and engaging the ceiling and moving the second pin within a second cylinder and extending a distal end of the second pin outward beyond the lower side of the body and engaging the floor.

In another aspect, the method further comprising maintaining a relative position between the first pin and the first cylinder and the second pin and the second cylinder while rotating the sleeve and retracting the first pin and the second pin.

The features, functions and advantages that have been discussed can be achieved independently in various aspects or may be combined in yet other aspects, further details of which can be seen with reference to the following description and the drawings.

DETAILED DESCRIPTION

Figure 1:
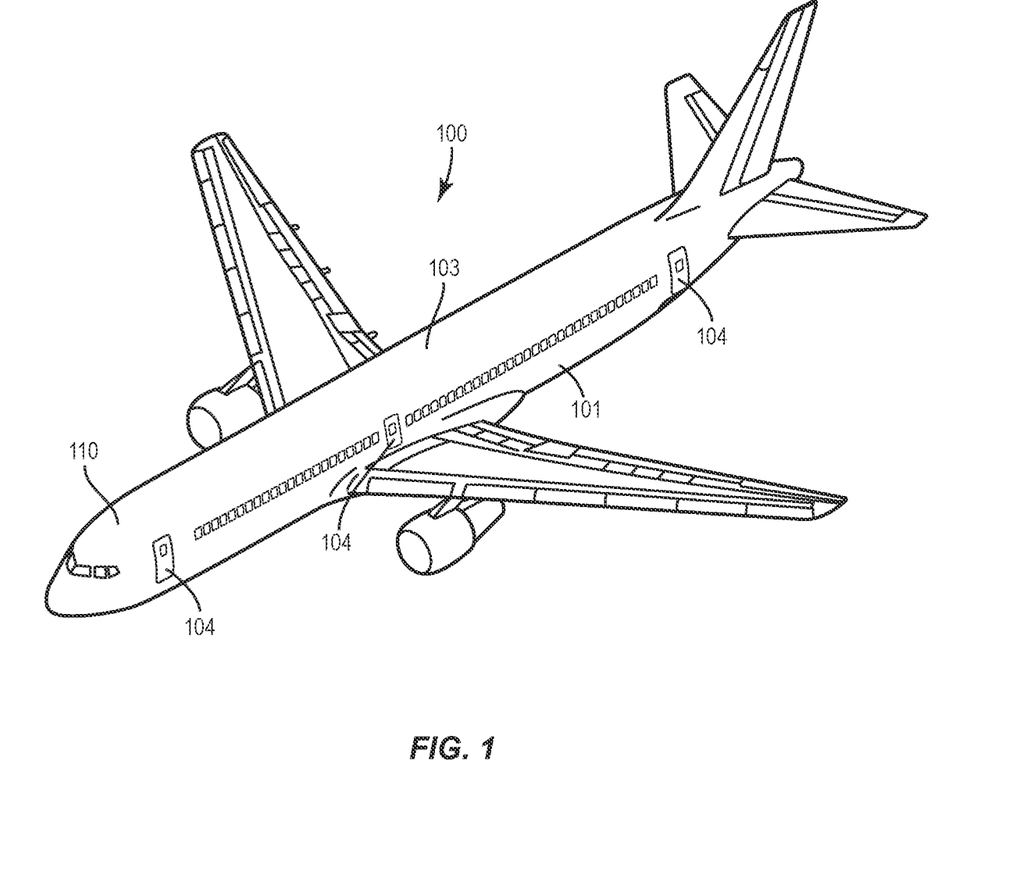
FIG. 1 is a perspective view of an aircraft.
Figure 2:
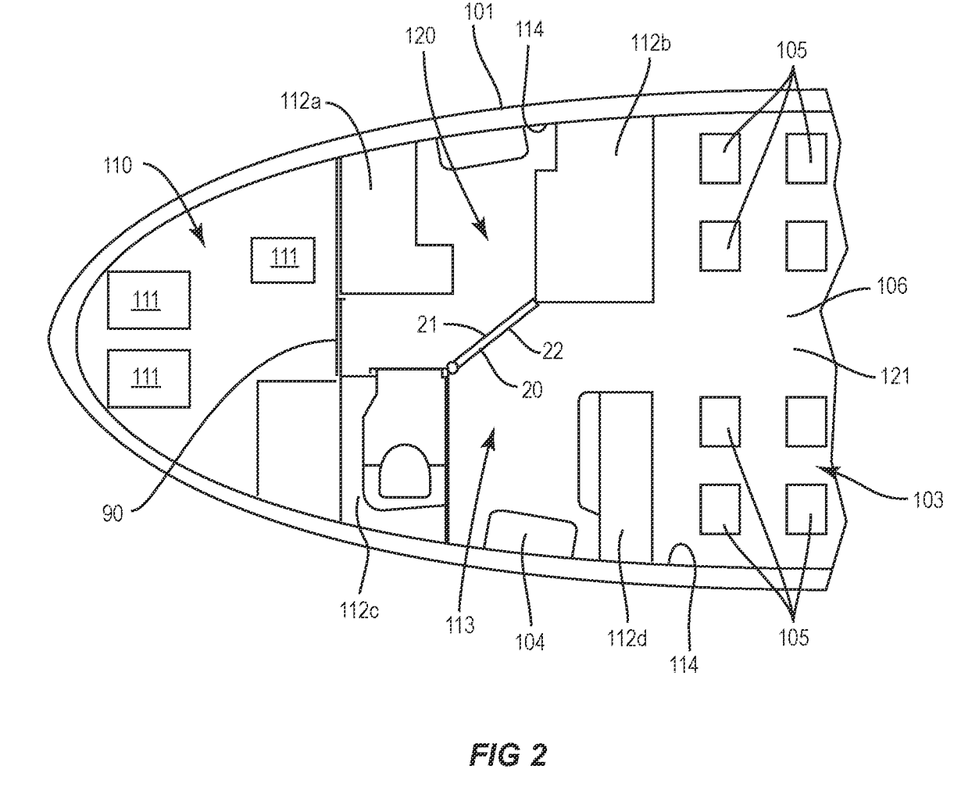
FIG. 2 is a top schematic view of an interior of the aircraft of FIG. 1 including the flight deck and the cabin area.

FIGS. 1 and 2 illustrate an aircraft 100 that includes a fuselage 101. A flight deck 110 is positioned at a front of the fuselage 101 and a cabin area 103 is positioned rearward. The cabin area 103 is equipped for accommodating passengers. The size of the flight deck 110 and the cabin area 103 can vary depending upon the aircraft 100. One or more exterior doors 104 provide for passengers and the flight personnel to enter and exit the fuselage 101.

The flight deck 110 includes one or more seats 111 for the flight personnel including but not limited to the pilot, co-pilot, and other authorized persons. Various controls and instrument panels (not illustrated) are located for use by the pilot and co-pilot to control the aircraft 100.

The cabin area 103 is positioned along the fuselage 101 rearward of the flight deck 110. The cabin area 103 includes a passenger section 121 with seats 105 arranged in rows along one or more aisles 106. In some examples such as a commercial airline, the seats 105 extend throughout the cabin area 103. In other examples in which the aircraft 100 is used for cargo transport, a limited number of seats 105 are positioned in the cabin area 103.

The cabin area 103 also includes a vestibule 120 positioned between the flight deck 110 and the passenger section 121. The vestibule 120 includes one or more monuments 112 that are mounted to the structural members of the aircraft 100 within the fuselage 101. The monuments 112 are functional units with examples including but not limited to galleys, lavatories, and stowage units. In some examples, the monuments 112 are shaped and sized to extend from the floor 107 to the ceiling 108 of the cabin area 103. In some examples, the monuments 112 extend between a wall 114 of the fuselage 101 to an aisle 106. FIG. 2 includes the vestibule 120 including a pair of galley monuments 112a, 112b, a lavatory monument 112c, and a stowage monument 112d.

Figure 3:
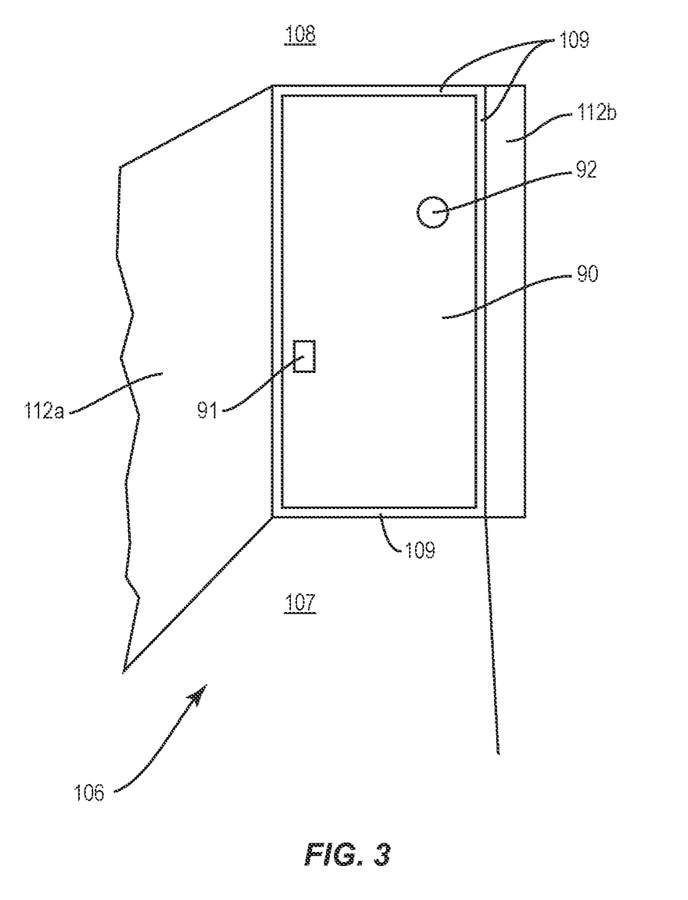
FIG. 3 is a perspective view of a flight deck door in a closed position.

A flight deck door 90 separates the flight deck 110 from the cabin area 103, and in some examples specifically separates the flight deck 110 from the vestibule 120. The flight deck door 90 prevents unintended persons from entering the flight deck 110 from the cabin area 103. As illustrated in FIG. 3, the flight deck door 90 includes a lock 91 configured to secure the door 90 in the closed position. The lock 91 can include various configurations for unlocking, such as a magnetic card reader and input buttons. A viewing hole 92 provides for the flight personnel on the flight deck 110 to see into the cabin area 103 without opening the door 90. In some examples, the door 90 is mounted in a frame 109 that mounts onto one or more of the monuments 112, floor 107, and ceiling 108.

As illustrated in FIG. 2, the cabin area 103 further includes an opening 113 in proximity to the flight deck 110. In this example, the opening 113 is formed between two monuments-galley monument 112b and lavatory monument 112c. Other examples include the opening 113 formed between monuments 112b and 112d, and the opening 113 formed between monuments 112a and 112c. Other examples include the opening 113 formed between various components, such as monuments 112, walls 114 of the fuselage 101, and seats 105.

A barrier door 20 is positioned at the opening 113 and includes a front side 21 that faces towards the front of the aircraft 100 and an opposing rear side 22. The barrier door 20 is movable between an open position and a closed position (as illustrated in FIG. 2). In the open position the barrier door 20 is retracted or otherwise configured to allow people to pass through the opening 113, such as for passengers to use the lavatory 112c or flight personnel to move between the flight deck 110 and passenger section 121. In the closed position, the barrier door 20 extends across and is locked within the opening 113. In the closed position the barrier door 20 functions to delay or otherwise slow the movement of a person moving from the passenger section 121 towards the flight deck 110. This time provides for the flight deck door 90 to be closed and locked.

Figure 4:
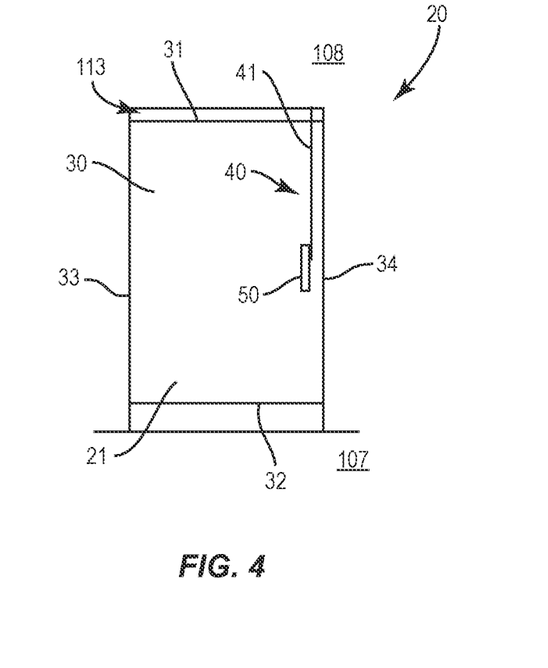
FIG. 4 is a front view of a barrier door in a closed position.
Figure 5:
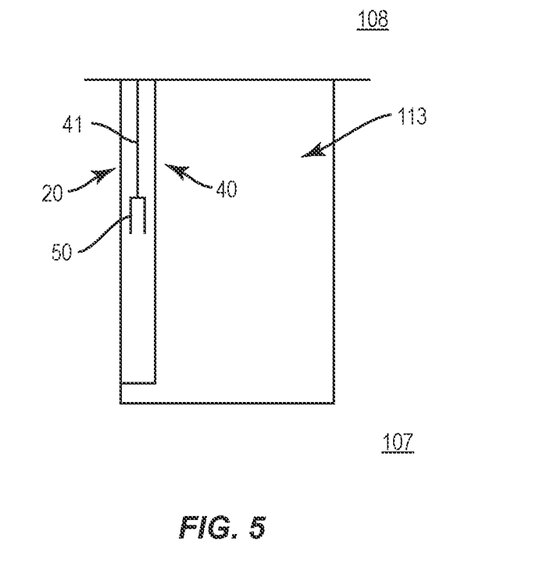
FIG. 5 is a front view of the barrier door of FIG. 4 in an open position.

FIG. 4 schematically illustrates a barrier door 20 in a closed position. The barrier door 20 includes a body 30 sized to extend across the opening 113. A lock 40 that includes one or more elongated members 41 is secured to the body 30 and movable between engaged and disengaged positions. In the engaged position, the one or more elongated members 41 extend outward and engage with the structure of the aircraft 100 to maintain the barrier door 20 in the closed position. The structure of the aircraft 100 can include but is not limited to one or more of the floor 107, ceiling 108, monument 112, seat 105, frame 109, and outer wall 114. The lock 40 further includes a release mechanism 50 that provides for moving the one or more elongated members 41 to the disengaged position. In the disengaged position as illustrated in FIG. 5, the one or more elongated members 41 are retracted away from the structure of the aircraft 100 to allow for the barrier door 20 to move between the open and closed positions.

The body 30 can include various shapes and sizes. In one example, the body 30 in the closed position is rectangular and includes an upper side 31, lower side 32, and lateral sides 33, 34 and is sized to extend across the opening 113. In some examples, the body 30 is sized to completely fill the opening 113. In other examples, the body 30 is smaller than the opening 113 with one or more gaps positioned between the body 30 and the edges of the opening 113. In the open position, the barrier door 20 is positioned to allow persons to move through the opening 113. In some examples as illustrated in FIG. 5, the body 30 can fold or otherwise retract to fill a limited portion of the opening 113 and allow for persons to pass. In another example, the body 30 is connected to the structure of the aircraft such as along one of the lateral sides and pivots on a hinge away from the opening 113.

Figure 6:
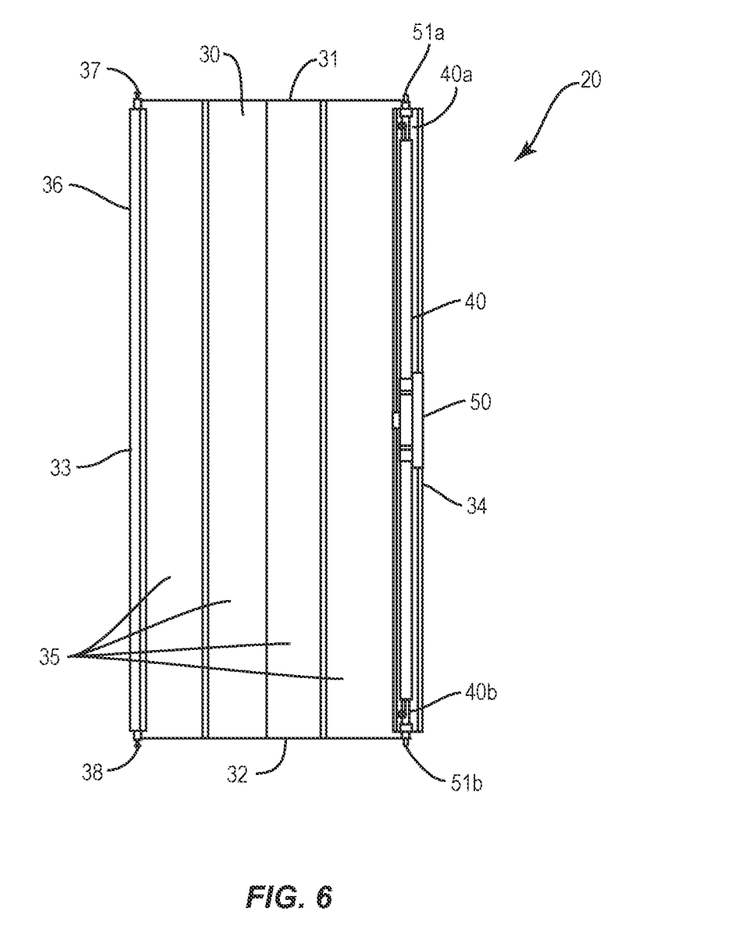
FIG. 6 is a front view of a barrier door.

The body 30 can have a variety of different constructions. In some examples, the body 30 is constructed as a single unitary piece, such as a large solid panel. In another example, the body 30 is constructed from multiple different sections that are mounted together. The different sections can be fixedly positioned relative to one another or can be movable relative to each other. FIG. 6 illustrates an example with the body 30 formed by vertical slats 35 that are hingedly connected together. The lateral sides of the slats 35 are connected together to provide for pivoting movement. The connection between the slats 35 can include rods that extend along the height, or the lateral sides of the slats 35 can include fingers that engaged together and provide for the relative movement.

In some examples as illustrated in FIG. 6, a mount 36 is configured to mount the body 30 in the opening 113. The mount 36 is positioned on the lateral side 33 and includes pins 37, 38 that extend outward beyond the upper and lower sides 31, 32 to engaged with the ceiling 108 and floor 107 respectively. In some examples, the mount 36 provides for the body 30 to be pivotally mounted in the opening 113.

The lock 40 secures the door 20 in the closed position. The lock 40 is attached to the body 30 and can be positioned at various locations. In one example as illustrated in FIG. 6, the lock 40 is positioned along the lateral side 34 and configured to extend outward from one or both of the upper side 31 and lower side 32 in the engaged position. In other examples, the lock 40 is orientated horizontally across the body 30 and configured to extend outward from one or both of the lateral sides 33, 34 in the engaged position.

Figure 7:
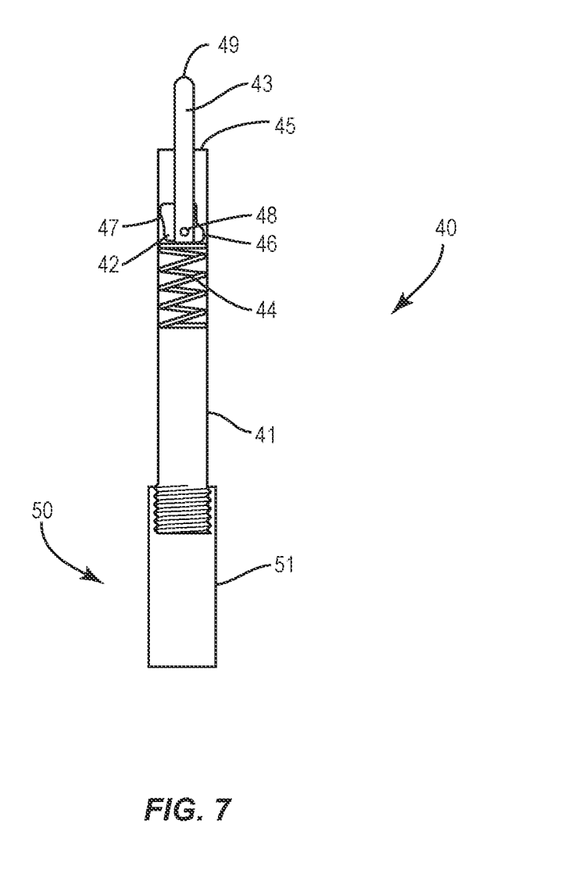
FIG. 7 is a schematic section view of a lock.

FIG. 7 illustrates a schematic diagram of the lock 40 that includes an elongated member 41. A pin 43 is connected to the elongated member 41. In some examples as illustrated in FIG. 7, the elongated member 41 is a cylinder with a hollow interior space that houses the pin 43. In other examples, the elongated member 41 is a rod and the pin 43 is attached to an exterior of the rod. The pin includes an elongated shape with a distal end 49. The pin 43 is biased outward by biasing member 44. The pin 43 includes a handle 48 that extends outward through an opening 42 in the elongated member 41. In a disengaged position, the handle 48 is positioned in a first section 46 of the opening 42. The handle 48 abuts against the edge of the first section 46 which positions the end 49 of the pin 43 in a retracted position. In some examples, the retracted positions includes the distal end 49 within the end 45 of the elongated member 41. In other examples, the distal end 49 extends outward beyond the body 30. In the engaged position as illustrated in FIG. 7, the pin 43 is rotated relative to the elongated member 41 to position the handle 48 in the second section 47 of the opening 42. The second section 47 extends closer to the end 45 of the elongated member 41. The force of the biasing member 44 pushes the pin 43 outward until the handle 48 contacts against the upper edge of the second section 47. This positioning causes the pin 43 to extend outward beyond the end 45 of the elongated member 41 and engage with the aircraft structure.

The lock 40 also include a release mechanism 50. The release mechanism 50 includes a sleeve 51 that is threaded onto the elongated member 41. The sleeve 51 is attached to the body 30 and threaded onto the elongated member 41. The sleeve 51 can rotate but does not move along an axial length of the elongated member 41. Therefore, rotation of the sleeve 51 in a first direction causes the elongated member 41 (and attached pin 43) to move in a first direction (e.g., retract inward relative to the body 30). Rotation in a second direction causes the elongated member 41 to move in a second direction (e.g., extend outward relative to the body 30). The sleeve 51 can be rotated in the directions to move the lock 40 between the engaged and disengaged positions.

Figure 8:
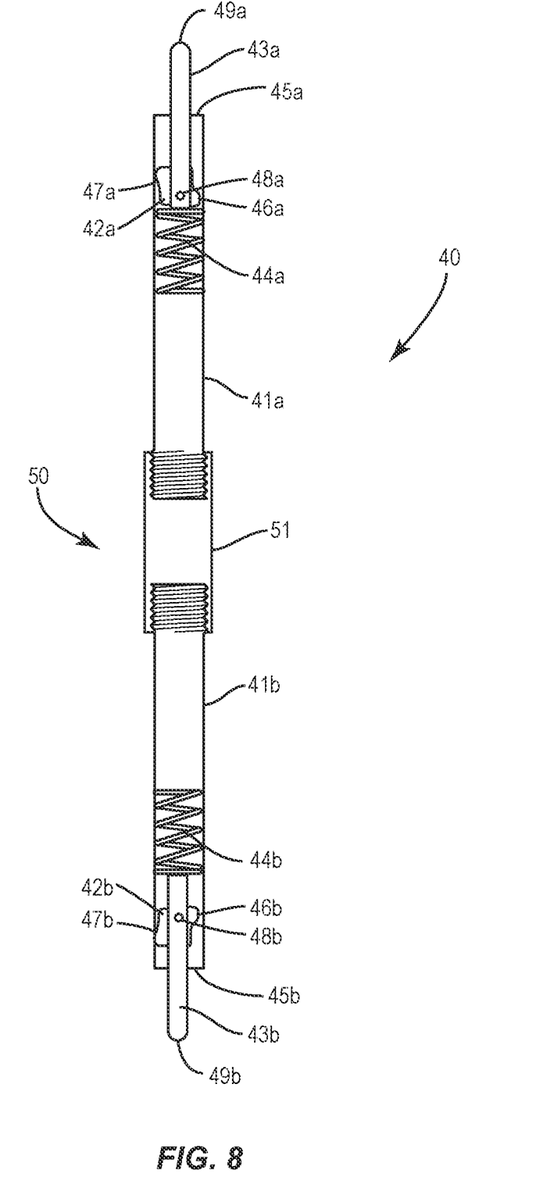
FIG. 8 is a schematic section view of a lock.

FIG. 8 illustrates a lock 40 configured to engage with two opposing sections of the aircraft structure such as the floor 107 and ceiling 108. The lock 40 includes a pair of elongated members 41a, 41b that are connected by threads to a sleeve 51. Pins 43a, 43b are positioned within the interior space of the elongated member 41a, 41b. The pins 43a, 43b include elongated bodies with outer ends 49a, 49b. The pins 43a, 43b are biased outward along the elongated members 41a, 41b by biasing members 44a, 44b.

Figure 9A:
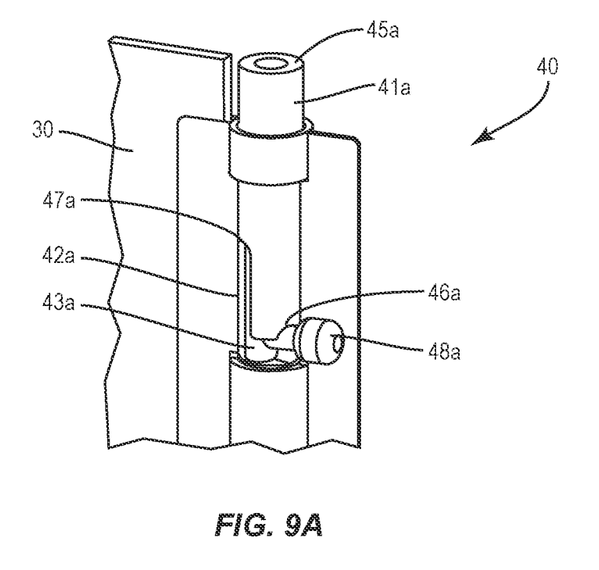
FIG. 9A is a perspective view of a portion of a lock in a disengaged position.
Figure 9B:
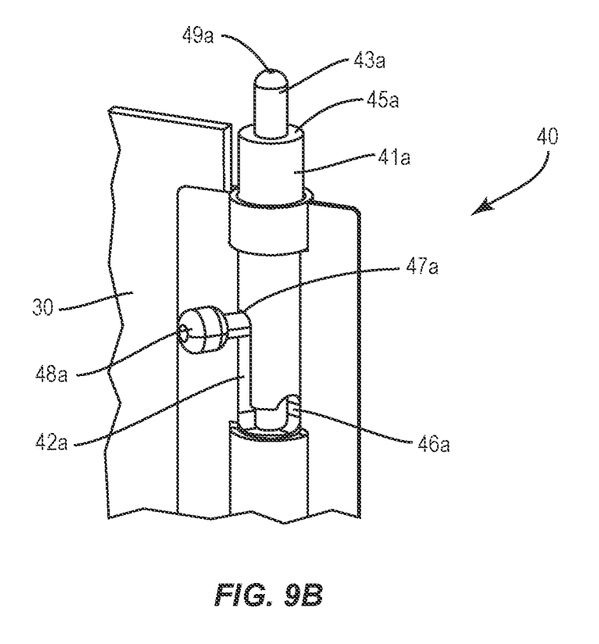
FIG. 9B is a perspective view of a portion of the portion of the lock in FIG. 9A in an engaged position.

FIGS. 9A and 9B illustrate the lock 40 moving between the disengaged position (FIG. 9A) and the engaged position (FIG. 9B) to secure the barrier door 20. FIGS. 9A and 9B illustrate the movement of the first pin 43a with the understanding that the second pin 43b operates in a similar manner.

The pin 43a includes a handle 48a that extends outward from a main section that is positioned in the hollow interior space of the elongated member 41a. Further the elongated member 41a includes an opening 42a in communication with the interior space. The opening includes a first section 46a and a second section 47a. During use, the pin 43a is rotated relative to the elongated member 41a with the handle 48a positioned in the first section 46a of an opening 42a. The biasing member 44a (not illustrated in FIGS. 9A and 9B) applies a force to the pin 43a to position the handle 48a against an outer side of the first section 46a. This contact between the handle 48a and first section 46a positions the pin 43a axially along the elongated member 41 with the end 49a retracted inward from the end 45a of the elongated member 41a. The lock 40 is positioned on the body 30 such that the elongated member 41a does not engage with the aircraft structure and thus the barrier door 20 can move between the open and closed positions.

In the engaged position of FIG. 9B, a person such as a flight personnel, grasps the handle 48a and rotates the pin 43a to move the handle 48a into the second section 47a of the opening 42a. The outer side of the second section 47a is in closer proximity to the end 45a of the elongated member 41a. The force applied by the biasing member moves the pin 43a axially outward from the elongated member 41a. The extent of axial movement is controlled by the contact of the handle 48a against the outer edge of the second section 47a. The extension of the pin 43a outward beyond the elongated member 41a and beyond the body 30 provides for the pin 43a to engage with the aircraft structure and lock the barrier door 20 in the closed position.

To move the lock 40 back to the unlocked position, the person grasps the handle 48a and applies a force downward away from the end 45a of the cylinder 41a. The force overcomes the force of the biasing member and moves the pin 43a along the second section 47a of the opening 42a. When the handle 48a is aligned with the first section 46a, the person applies a sideways force to move the handle 48a into the first section 46a. The person then releases the handle 48a as the force of the biasing member contacts the handle 48a against the outer edge of the first section 46a to maintain the position.

In some examples, the one or more handles 48 are accessible from just one side of the barrier door 20. Using the example of FIG. 2, the handles 48 are positioned on the front side 21 of the barrier door 20 to be accessible to the flight personnel in the vestibule 120 and/or flight deck 110. This positioning also prevents access to a person from the passenger section 121 as the handles 48 are not accessible from the rear side 22.

Figure 10:
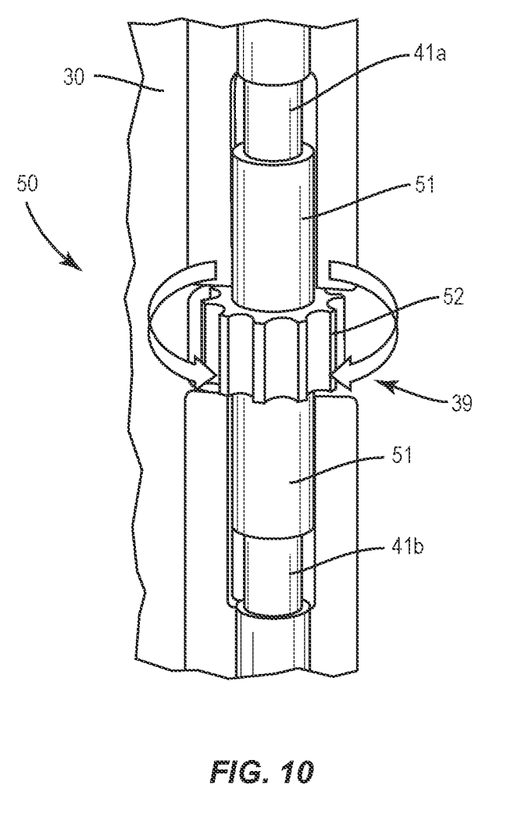
FIG. 10 is a perspective view of a release mechanism of a lock.

The release mechanism 50 provides for moving the pins 43a, 43b (and elongated members 41a, 41b) inward to the disengaged position without using the handles 48. As illustrated in FIGS. 8 and 10, the release mechanism 50 includes a sleeve 51 that is threaded onto the cylinders 41a, 41b. Rotation of the sleeve 51 relative to the elongated members 41a, 41b causes the elongated members 41a, 41b to retract inward into the sleeve 51. This movement causes the pins 43a, 43b to also retract inward towards and/or into the body 30 and disengage from the aircraft structure. The sleeve 51 includes a knob 52 with raised edges that facilitate grasping and applying a force by the user.

In some examples, the threads on the outer ends of the sleeve 51 are opposite one another. This provides for rotation of the sleeve 51 in one direction to cause retraction of both of the elongated members 41a, 41b. Likewise, rotation in the other direction causes extensions of both of the elongated members 41a, 41b.

In some examples, the sleeve 51 is accessible from both the front side 21 and the rear side 22 of the barrier door 20. As illustrated in FIG. 10, the body 30 includes an opening 39 sized for the knob 52. This positioning provides for the knob 52 to be used from both sides of the barrier door 20. This provides for flight personnel in the vestibule 120 and/or flight deck 110 to unlock the barrier door 20, such as if one or both pins 43a, 43b are stuck in an extended position. This also provides for a passenger in the passenger section 121 to unlock the barrier door 20 in the event of an emergency in which they need to pass through the opening 113. In other examples, the sleeve 51 of the release mechanism 50 is just accessible from a single side of the barrier door 20.

In some examples, the barrier door 20 functions to slow the movement of a person through the opening 113. The sleeve 51 is threaded such that it takes an extended time (e.g. 10-20 seconds) to rotate the sleeve 51 and disengage the one or more pins 43. This time provides for flight personnel to close and lock the flight deck door 90 and prevent the person from entering the flight deck 110.

Figure 11A:
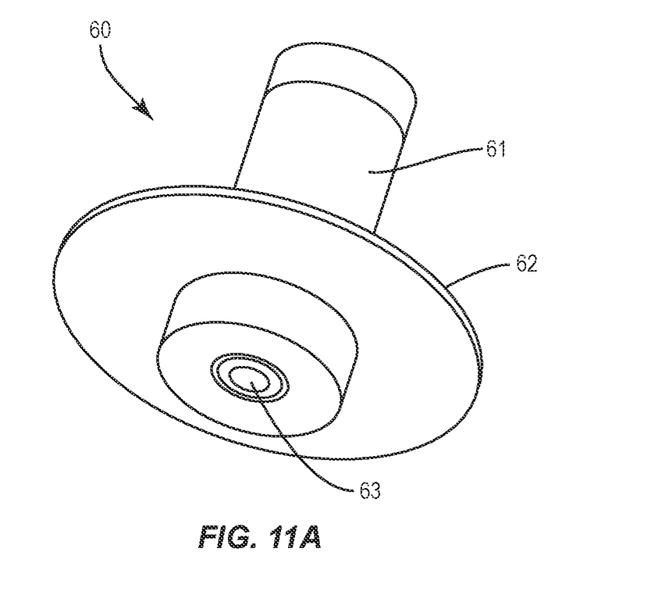
FIG. 11A is a perspective view of a receptacle.
Figure 11B:
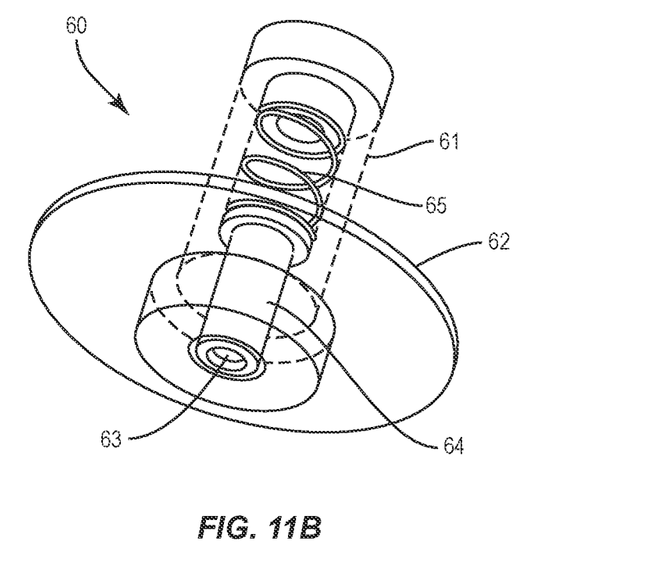
FIG. 11B is a schematic section view of the receptacle of FIG. 11A.

In some examples, the one or more pins 43 contact against the aircraft structure in the engaged position. This can include extending into corresponding holes in the aircraft structure, such as in the floor 107 and ceiling 108. In other examples, the one or more pins 43 simply contact against the structure without extending into holes. In other examples, a receptacle 60 is mounted to the aircraft structure to receive the pin 43. As illustrated in FIGS. 11A and 11B, the receptacle 60 includes a body 61 and a flange 62. When mounted to the aircraft structure, the body 61 is recessed into the structure and the flange 62 extends along the surface. An opening 63 extends through the flange 62 and into the body 61 to receive the pin 43. A plug 64 is mounted in the opening 63 and biased outward by a biasing member 65. In the engaged position, the pin 43 extends into the opening 63 and contacts against the plug 64. The force of the pin 43 moves the plug 64 against the biasing member 65 and further into the body 61.

Figure 12:
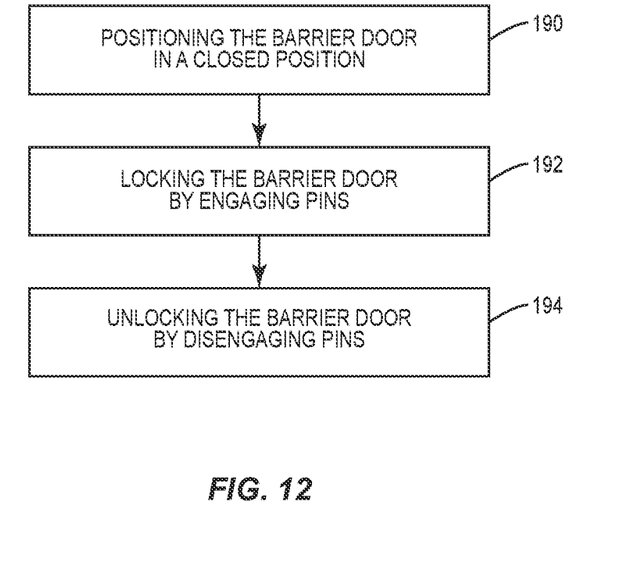
FIG. 12 is a flowchart diagram of a method of controlling movement of passengers through an opening within a cabin area of an aircraft.

FIG. 12 illustrates a method of controlling movement of passengers through an opening 113 within a cabin area 103 of an aircraft 100. The barrier door 20 is positioned in a closed position that extends across the opening 113 (block 190). In some examples, this occurs prior to opening the flight deck door 90. While in the closed position, the barrier door 20 is locked by moving a first pin 43a and a second pin 43b that are each connected to the barrier door 20 to engaged positions (block 192). In some examples, locking the barrier door 20 includes a person (e.g., flight personnel) grasping and rotating the first handle 48a from the first section 46a to the second section 47a of the opening 42a and extending the first pin 43a outward beyond an upper side 31 of a body 30 of the barrier door 20 and engaging the first pin 43a with a ceiling 108. The person also grasps and rotates the second handle 48b and rotates the pin in a similar manner to extend the second pin 43b outward beyond a lower side 32 of the body 30 and into engagement with a floor 107 of the aircraft. In some examples, locking the barrier door 20 includes positioning just a single pin 43 into engagement with the aircraft structure. The barrier door 20 remains in the closed position allowing for the flight deck door 90 to be opened. After the flight deck door 90 is closed, the barrier door 20 is unlocked and moved to the open position (block 194). In some examples, unlocking the barrier door 20 includes flight personnel grasping the handle 48 on each pin 43 and sliding the pin 43 inward and disengaging the pin 43 from the aircraft structure.

Figure 13:
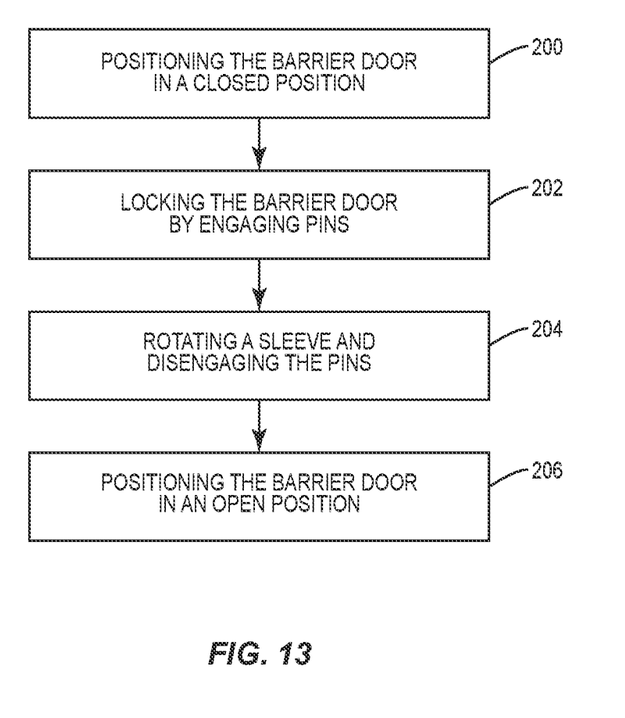
FIG. 13 is a flowchart diagram of a method of controlling movement of passengers through an opening within a cabin area of an aircraft.

FIG. 13 illustrates a method of controlling movement of passengers through an opening 113 within a cabin area 103 of an aircraft 100. In some examples, this method occurs when one or more of the pins 43 get suck or jammed and the barrier door 20 cannot be opened in a straight-forward manner (such as the method disclosed in FIG. 12). This method may also occur when a person in the passenger section 121 needs access to the other side of the barrier door 20 such as access to the vestibule 120 or flight deck 110. This may occur in the event of a medical emergency or if an unauthorized person is forward of the barrier door 20. In this method, the barrier door 20 is positioned in a closed position that extends across the opening 113 (block 200). While in the closed position, the barrier door 20 is locked by moving a first pin 43a and a second pin 43b that are each connected to the barrier door 20 to engaged positions (block 202). In some examples, the engaged positions include the first pin 43a extending outward beyond an upper side 31 of a body 30 of the barrier door 20 and engaging the first pin 43a with a ceiling 108 of the aircraft and with the second pin 43b extending outward beyond a lower side 32 of the body 30 and engaging the second pin 43b with a floor 107 of the aircraft. In some examples, locking the barrier door 20 includes engaging just a single pin 43. While the barrier door 20 is locked with the pins 43a, 43b in the engaged positions, a sleeve 51 that is connected to the body 30 is rotated which retracts the first pin 43a and disengages the first pin 43a from the ceiling 108 and simultaneously retracts the second pin 43b and disengages the second pin 43b from the floor 107 (block 204). While the first pin 43a and the second pin 43b are disengaged, the barrier door 20 is positioned in an open position that opens the opening 113 (block 206).

In some examples, the biasing members 44, 65 are springs. In other examples, the biasing members are a foam block or other flexible material that applies an outward force.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A barrier door to control movement of persons through an opening within a cabin area of an aircraft, the barrier door comprising:
    a body comprising an upper side, a lower side, and lateral sides;
    a lock connected to the body, the lock comprising:
        a cylinder with an elongated shape comprising an inner end and an outer end, the cylinder further comprising an interior space that is hollow;
        a pin positioned within the interior space of the cylinder and movable between a disengaged position with a distal end retracted within the interior space and an engaged position with the distal end extending outward beyond the outer end of the cylinder;
        a biasing member that biases the pin towards the engaged position; and
        a release mechanism threaded to the inner end of the cylinder, the release mechanism rotatable relative to the cylinder to adjust a position of the cylinder and pin relative to the body.

2. The barrier door of claim 1, wherein the outer end of the cylinder is aligned with the upper side of the body for the pin to extend outward beyond the body in the engaged position.

3. The barrier door of claim 1, wherein the release mechanism comprises a sleeve that extends around the inner end of the cylinder, the sleeve comprising interior threads and the cylinder comprising exterior threads.

4. The barrier door of claim 1, further comprising a receptacle configured to be mounted in proximity to the body, the receptacle comprising a biased plug sized to contact against the distal end of the pin when the pin is in the engaged position.

5. The barrier door of claim 1, wherein the body comprises a plurality of vertical slats that are hingedly connected together, the barrier door movable between an open position with the vertical slats in a folded configuration and a closed position with the vertical slats in an unfolded configuration.

6. The barrier door of claim 1, wherein the pin is fixedly positioned relative to the cylinder during rotation of the release mechanism.

7. The barrier door of claim 1, further comprising:
    a handle that extends outward from the pin;
    an opening in the cylinder that is in communication with the interior space, the opening comprising a first section and a second section; and
    wherein the handle is in the first section of the opening when the pin is in the disengaged position and in the second section of the opening when the pin is in the engaged position.

8. The barrier door of claim 7, wherein the body comprises a first side and a second side, wherein the handle extends outward beyond the first side of the body and is positioned away from the second side of the body.

9. The barrier door of claim 8, further comprising:
    an opening in the body;
    the release mechanism comprises a sleeve; and
    wherein the sleeve is positioned in the opening and the sleeve is accessible from both the first side of the body and the second side of the body.

10. A barrier door to control movement of persons through an opening within a cabin area of an aircraft, the barrier door comprising:
    a body comprising an outer perimeter;
    a sleeve connected to the body;
    a first elongated member connected to and extending outward from the sleeve in a first direction;
    a second elongated member connected to and extending outward from the sleeve in a second direction;
    a first pin connected to the first elongated member and a second pin connected to the second elongated member, the first pin and the second pin movable between retracted positions that are inward within the outer perimeter of the body and extended positions that are outward beyond the outer perimeter of the body; and
    wherein the sleeve is rotatable relative to the first elongated member and the second elongated member to move both of the first pin and the second pin inward within the outer perimeter of the body in the extended positions.

11. The barrier door of claim 10, wherein each of the first elongated member and the second elongated member are cylinders with a hollow interior space and the first pin is positioned within the first elongated member and the second pin is positioned within the second elongated member.

12. The barrier door of claim 10, wherein the first pin is fixedly positioned relative to the first elongated member during rotation of the sleeve and the second pin is fixedly positioned relative to the second elongated member during rotation of the sleeve.

13. The barrier door of claim 10, wherein the sleeve, the first elongated member, and the second elongated member are aligned together and extend along a lateral side of the body.

14. The barrier door of claim 10, wherein the sleeve is connected with threads to each of the first elongated member and the second elongated member.

15. The barrier door of claim 10, wherein each of the first pin and the second pin comprise a main body with a proximal end and a distal end and a handle that extends outward from the main body between the proximal end of the distal end with the handle extending outward from the respective first elongated member and the second elongated member in the retracted position.

16. The barrier door of claim 10, wherein the sleeve is positioned along a central section of the body and the first elongated member extends outward towards an upper side of the body with the first pin extending outward beyond the upper side of the body in the extended position.

17. The barrier door of claim 16, wherein the second elongated member extends outward towards a lower side of the body with the second pin extending outward beyond the lower side of the body in the extended position.

18. A method of controlling movement of passengers through an opening within a cabin area of an aircraft, the method comprising:
  positioning a barrier door in a closed position that extends across the opening;
  while in the closed position, locking the barrier door by moving a first pin and a second pin that are each connected to the barrier door to engaged positions with the first pin extending outward beyond an upper side of a body of the barrier door and engaging the first pin with a ceiling of the aircraft and with the second pin extending outward beyond a lower side of the body and engaging the second pin with a floor of the aircraft;
  while the first pin and the second pin are in the engaged positions, rotating a sleeve that is connected to the body and retracting the first pin and disengaging the first pin from the ceiling and simultaneously retracting the second pin and disengaging the second pin from the floor; and
  while the first pin and the second pin are disengaged, positioning the barrier door in an open position that provides passage through the opening.

19. The method of claim 18, further comprising moving the first pin within a first cylinder and extending a distal end of the first pin outward beyond the upper side of the body and engaging the ceiling and moving the second pin within a second cylinder and extending a distal end of the second pin outward beyond the lower side of the body and engaging the floor.

20. The method of claim 19, further comprising maintaining a relative position between the first pin and the first cylinder and the second pin and the second cylinder while rotating the sleeve and retracting the first pin and the second pin.

* * * * *